United States Patent
Gooding et al.

(10) Patent No.: US 6,176,542 B1
(45) Date of Patent: Jan. 23, 2001

(54) VEHICLE DOOR

(75) Inventors: Roger Charles Gooding, Shelby Township, Macomb County; Manhar Kantical Sheth, Troy, both of MI (US)

(73) Assignee: Delphi Technologies, Inc., Troy, MI (US)

(*) Notice: Under 35 U.S.C. 154(b), the term of this patent shall be extended for 0 days.

(21) Appl. No.: 09/409,513

(22) Filed: Sep. 30, 1999

(51) Int. Cl.[7] .................................................. B60J 5/00
(52) U.S. Cl. .................................. 296/146.6; 296/146.5; 296/188; 49/502; 49/503
(58) Field of Search ................ 296/146.5, 146.6, 296/188; 49/502, 503

(56) References Cited

U.S. PATENT DOCUMENTS

| | | | |
|---|---|---|---|
| 4,924,630 | * | 5/1990 | Lomasney et al. ............. 49/502 |
| 5,033,236 | * | 7/1991 | Szerdahelyi et al. ........... 49/502 |
| 5,226,259 | * | 7/1993 | Yamagata et al. .............. 49/502 |
| 5,570,922 | * | 11/1996 | Dereese et al. ............. 296/146.6 |
| 5,857,732 | * | 1/1999 | Ritchie ..................... 296/146.5 |
| 5,867,942 | * | 2/1999 | Kowalski ...................... 49/502 |
| 5,927,021 | * | 7/1999 | Kowalski et al. .............. 49/502 |
| 6,076,882 | * | 6/2000 | Szerdahelyi et al. ........... 49/502 |

* cited by examiner

Primary Examiner—D. Glenn Dayoan
Assistant Examiner—Lori L. Coletta
(74) Attorney, Agent, or Firm—Patricia M. Griffin

(57) ABSTRACT

The door assembly has an inner door panel, an outer door panel and a window module opening. A window module includes a module frame with a side impact beam assembly; a belt reinforcement beam, a front glass guide channel and a rear glass guide channel. A window is slideably mounted in the glass channels. A window regulator assembly is mounted on the module frame and connected to the window. Pin and slot connectors connect the side impact beam assembly to the inner door panel. Mechanical fasteners secure the belt reinforcement beam to the inner door panel.

10 Claims, 6 Drawing Sheets

VEHICLE DOOR

TECHNICAL FIELD

The invention is in an assembly door and more particularly in a vehicle door that received an operational window and hardware module.

BACKGROUND OF THE INVENTION

Vehicle doors are equipped with door hardware such as windows, window guides, window opening and closing assemblies, door latches and locks, sound system speakers and controls for the various accessories. These components are inserted into conventional doors with inner door panels and an outer skin through various small apertures. Each piece of door hardware is inserted in a predetermined order and secured in place by various mechanical fasteners. The positions of some of the parts are adjusted after other hardware parts are inserted into the space between the inner door panel and the outer door skin. This assembly process is time consuming, difficult and requires dexterity and skill.

These conventional doors may be assembled after the doors are secured to the main body of a vehicle. Assembly that occurs after attachment to a vehicle body occurs on an assembly line with the door moving.

Functional testing of the door hardware and door mounted controls can not be completed until the door is mostly complete. If a defective part was secured in place inside the door, it has to be removed, replaced and then retested. The removal and replacement of some hardware must wait until a vehicle is moved from an assembly line. Removal and replacement of defective parts after a vehicle leaves an assembly line is time consuming, requires skilled workers and is expensive.

SUMMARY OF THE INVENTION

The vehicle door has a formed inner door panel with a hinge face and a lock face. Front and rear load transfer brackets are secured inside the inner door panel.

A window module includes a side impact beam assembly and a belt line reinforcement beam. A front glass guide channel is secured to a front portion of the side impact beam and the belt reinforcement beam. A rear glass channel is secured to a rear portion of the side impact beam and to a rear portion of the belt reinforcement beam. The side impact beam assembly, the belt line reinforcement beam and the guide channels form a window module frame. A window is slideably mounted in the front glass guide channel and the rear glass guide channel. A window regulator assembly, for raising and lowering the window, is connected to the window, the side impact beam assembly and the belt reinforcement beam.

A complete window module is tested to insure that it is ready to be inserted into a door.

Following testing, the window module is inserted into the door through a large opening in the inner door panel. A front pin is inserted into a front slot to pivotally connect the front portion of the side impact beam assembly to the front load transfer bracket. A rear pin is inserted into a rear slot to pivotally connect the rear portion of the side impact beam assembly to the rear load transfer bracket. The belt reinforcement beam is then pivoted about the front pin and the rear pin and into contact with the inner door panel. Fasteners are then inserted into the belt reinforcement beam to secure the belt reinforcement beam to the inner door panel.

The window module is assembled in a separate window modular assembly area. Assembly is relatively easy when it takes place on a workpiece holder rather than inside a cavity between the inner door panel and an outer door skin or panel. Testing of the window module before it is mounted in a door cavity insure that the window module is fully functional upon arrival at a vehicle assembly location. A variety of outer door panels can be attached to the inner door panel. Each window module may be provided with attached hardware that is required for the vehicle in which the window module is to be mounted.

BRIEF DESCRIPTION OF THE DRAWINGS

The presently preferred embodiments of the invention are disclosed in the following description and in the accompanying drawing wherein.

DETAILED DESCRIPTION OF THE PREFERRED EMBODIMENT

Figure 1:
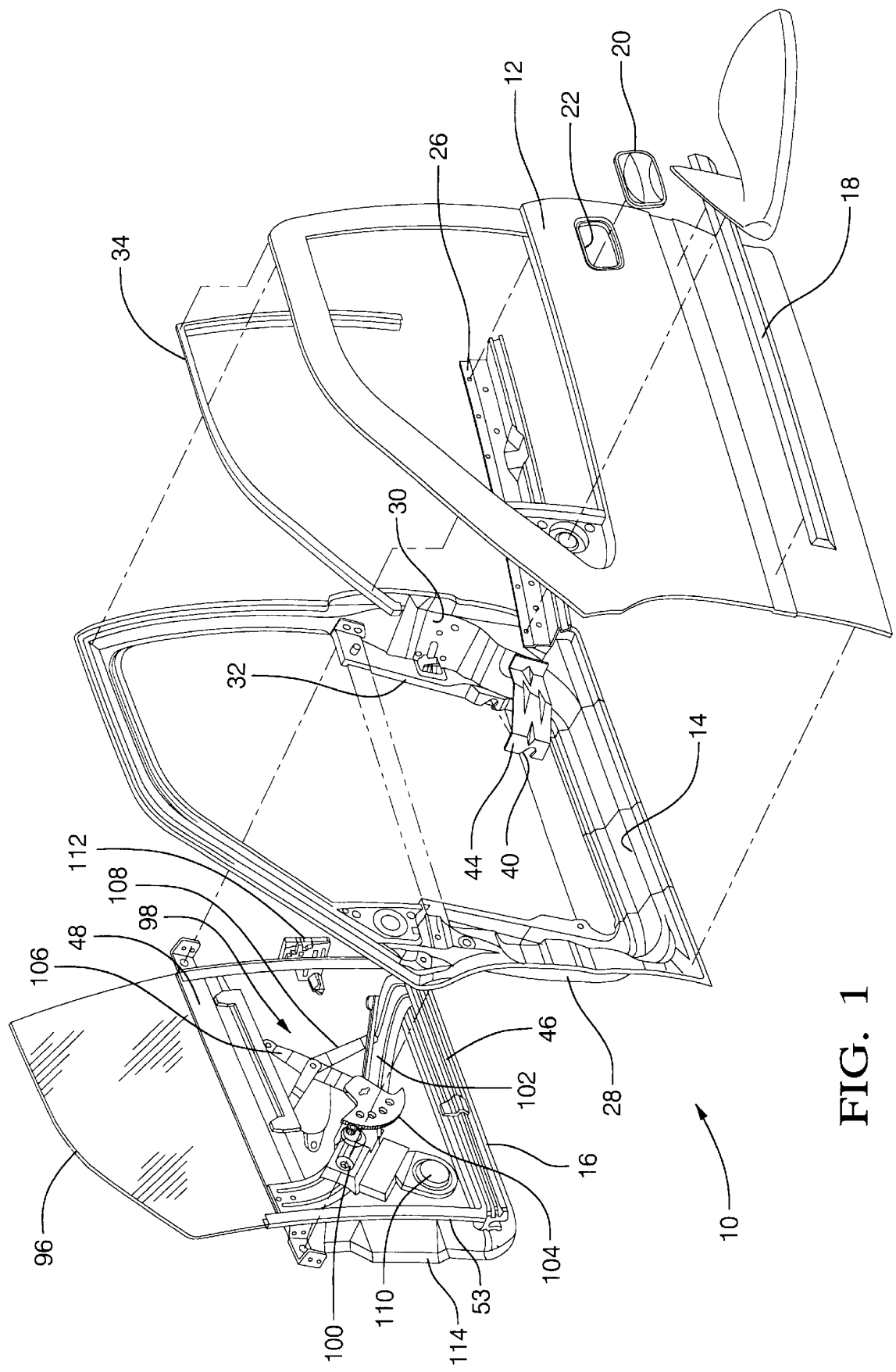
FIG. 1 is an expanded view of a vehicle door with a window module.

The vehicle door 10, as shown in FIG. 1, includes an outer door panel 12, an inner door panel 14 and an operational hardware, component and window module 16. The outer door panel 12 can have various design shapes to conform to the design of the vehicle body to which it is attached. A door side molding 18 is attached to an outer surface of the outer door panel 12 if side moldings are employed on the vehicle. An outer door handle 20 is mounted in a handle opening 22 through the outer door panel 12. An outside rear view door mirror 24 is attached to the forward portion of the front door panel 12. Door outer panel reinforcement beams 26 are each secured to an inside surface of each outer door panel 12. Various materials including steel, aluminum and plastics can be used to form the outer door panel 12.

The one piece inner door panel 14 is a steel stamping with a hinge face 28, a lock face 30 and a large hardware, component and window module opening 32. An upper glass channel 34 is secured to an upper portion of the inner door panel 14. Vehicle doors 10 for convertibles and some coupes employ frameless glass and do not have an upper glass channel 34 or an upper portion of the inner door panel 14 to hold the upper glass channel 34.

Figure 3:
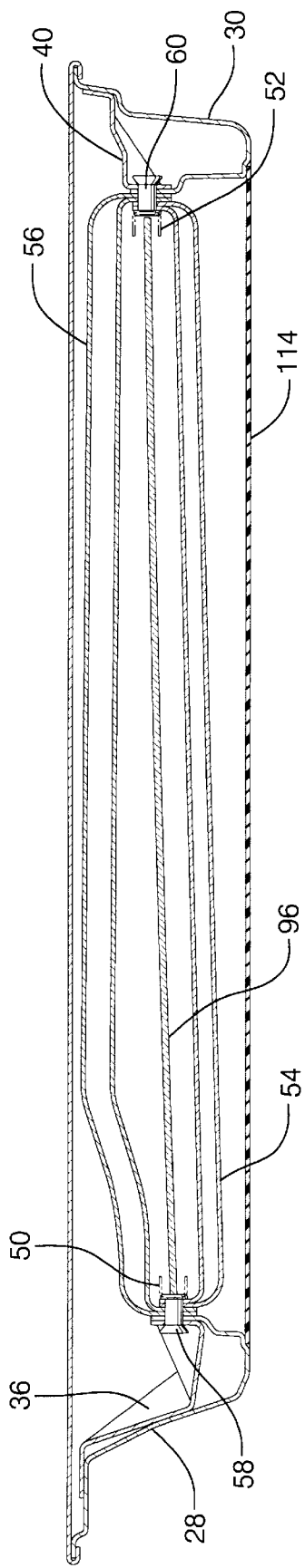
FIG. 3 is a sectional view taken along lines 3—3 in FIG. 2.
Figure 5:
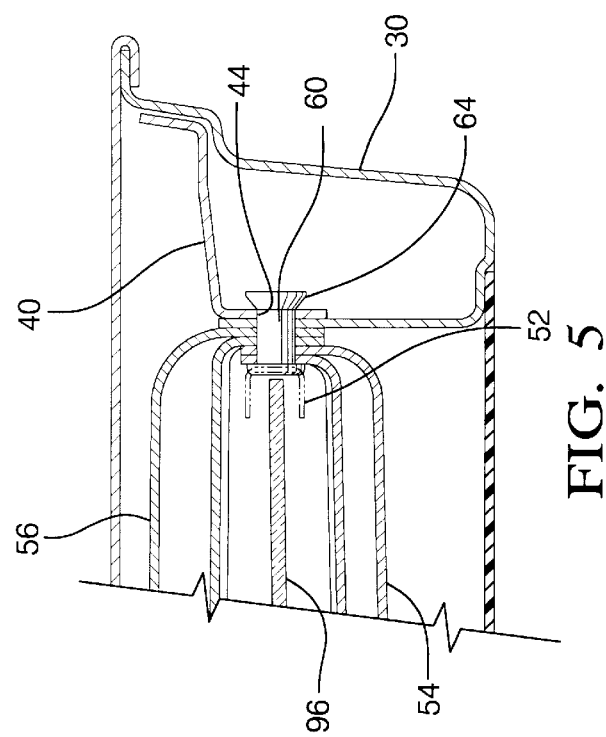
FIG. 5 is an enlarged view of the rear load transfer bracket and a rear portion of the side impact beam assembly as shown in FIG. 3.
Figure 4:
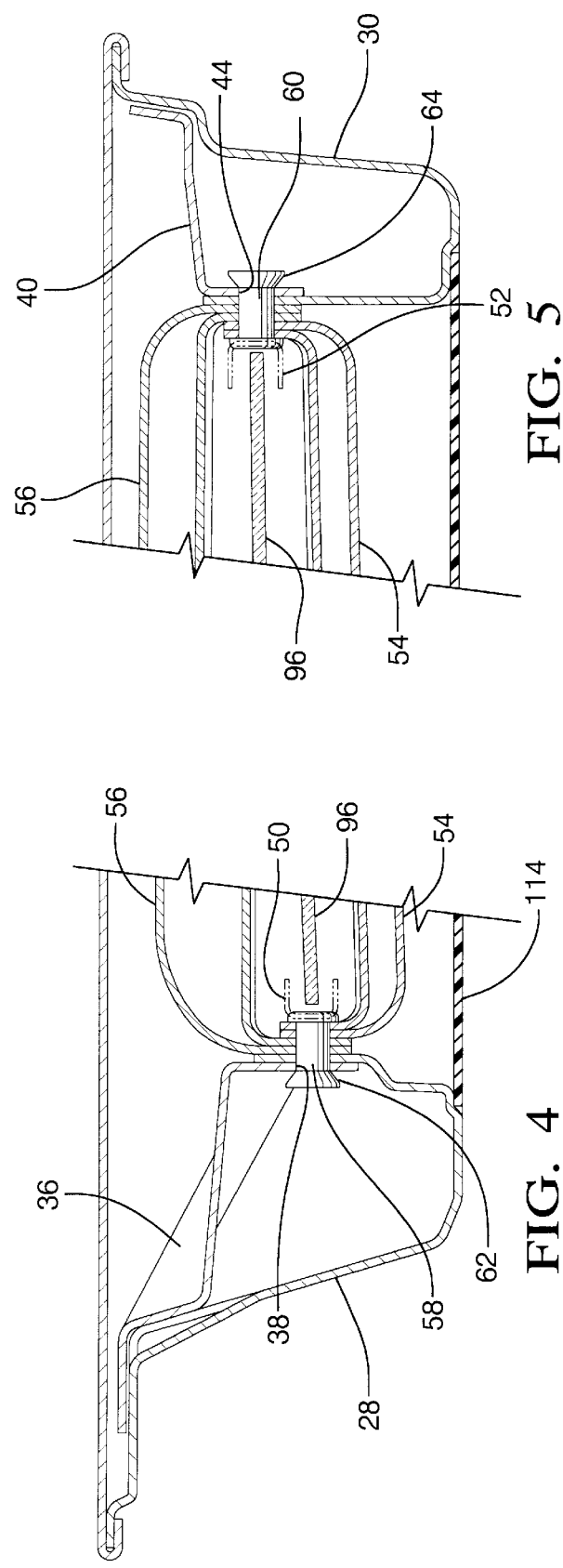
FIG. 4 is an enlarged view of the front load transfer bracket and a front portion of the side impact beam assembly as shown in FIG. 3.

A front load transfer bracket 36 is secured to a lower portion of the inner door panel 14 adjacent to hinge face 28 as shown in FIGS. 3 and 4. A slot 38 is formed in the front load transfer bracket 36 for securing the window module 16. A rear load transfer bracket 40 is secured to a lower portion of the inner door panel 14 adjacent to the lock face 30, as shown in FIGS. 3 and 5. A slot 44, as shown in FIG. 1 extends downwardly and outwardly from an open end to a closed end as shown in FIG. 1. The slot 38 also extends downwardly and outwardly from an open end to a closed end and is parallel to the slot 44.

The window module 16 includes a side impact beam assembly 46 and a belt inner reinforcement beam 48. A front glass guide channel 50 is connected to the front-end portions of the side impact beam assembly 46 and the belt inner reinforcement beam 48. A rear glass guide channel 52 is connected to the rear end portions of the side impact beam assembly 46 and of the belt inner reinforcement beam 48. The side impact beam assembly 46, the belt line reinforcement beam 48 and the guide channels 50, 52 form a window module frame 53 as best shown in FIG. 1.

The side impact beam assembly 46, as shown in FIGS. 3, 4 and 5 has an inner tubular beam 54 and outer tubular beam 56. The two beams 54 and 56 are attached to each other by beam assembly pins 58 and 60. A pin 58 also connects the front glass guide channel 50 to the beam assembly 46. The rear glass guide channel 52 is secured to the beam assembly 46 by the pin 60. The pins 58 and 60 are received in the slots 38 and 44 respectfully in the front load transfer bracket 36 and the rear load transfer bracket 40. As shown in FIGS. 3, 4 and 5 and described above, the beam assembly 46 resists bending loads due to side impacts. Compression loads are resisted by the beam assembly 46 to maintain separation between the hinge face 28 and the lock face 30. Tension loads on the beam assembly 46 are transferred through the enlarged heads 62 and 64 of the pins 58 and 60, the front and rear load transfer bracket 36 and 40, to the inner door panel 14.

Figure 8:
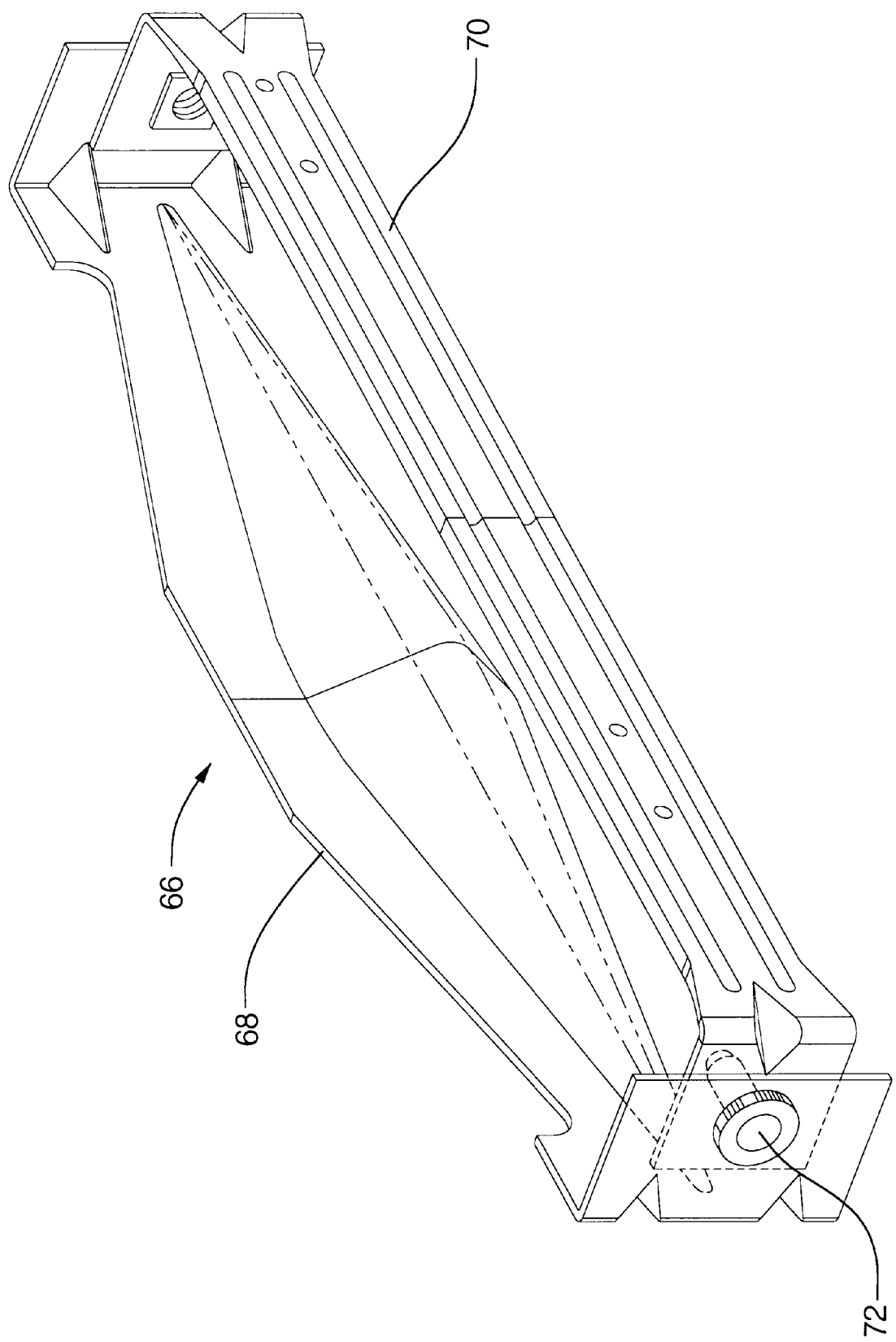
FIG. 8 is a perspective view of an alternate side impact beam assembly.
Figure 9:
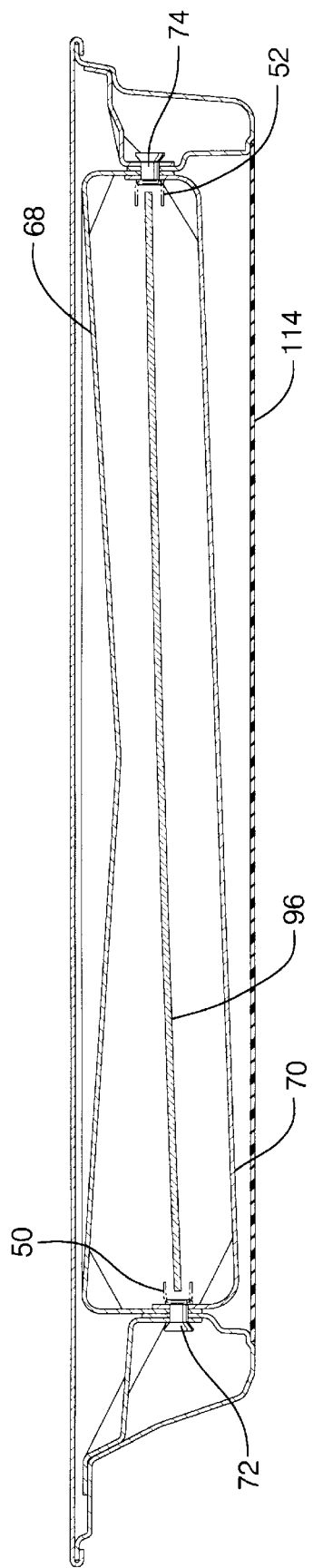
FIG. 9 is a sectional view taken along line 3—3 in FIG. 2 with an alternate inside side impact beam assembly.

An alternate side impact beam assembly 66 is shown in FIGS. 8 and 9. This beam assembly performs the same function as the beam assembly 46 described above. The outside beam 68 of the beam assembly 66 is shaped to resist side impact forces. The inside beam 70 resists compression and tension loads and services as a hardware-mounting beam. Pins 72 and 74 attach front and rear glass guide channel 50 and 52 to the beam assembly 66 and perform all the other functions performed by pins 58 and 60 as described above.

Figure 6:
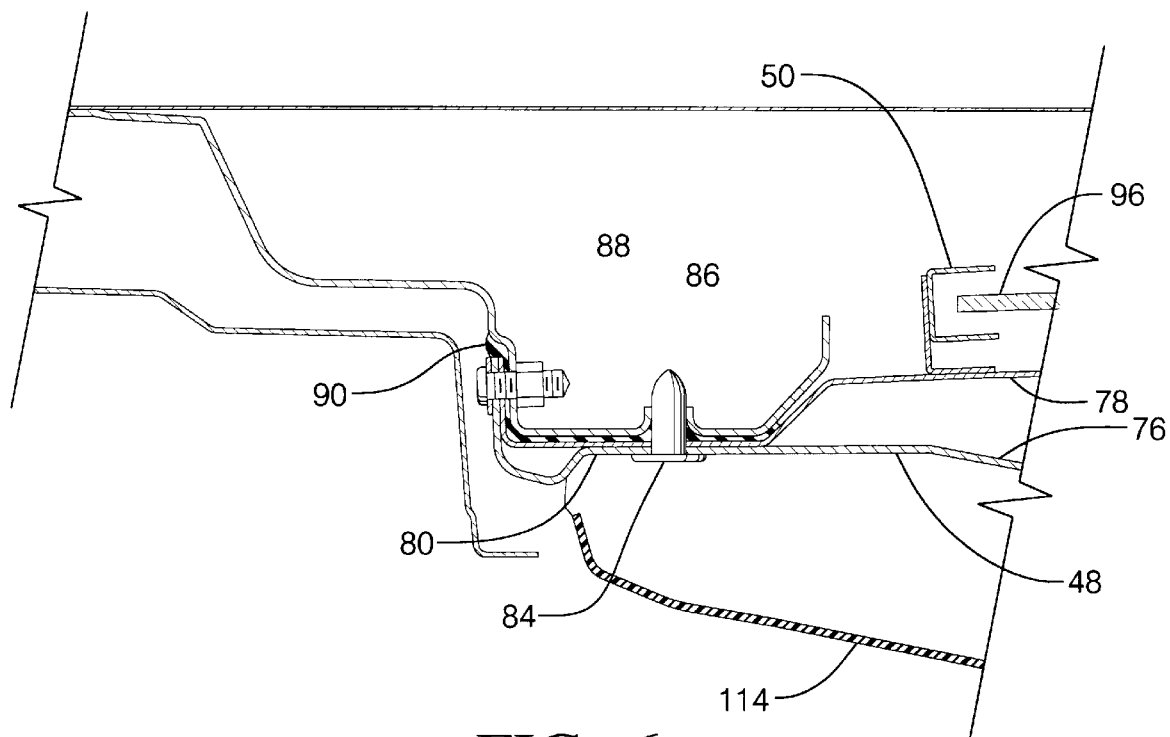
FIG. 6 is an enlarged horizontal sectional view of the front connection between the belt reinforcement beam and the inner door panel.
Figure 7:
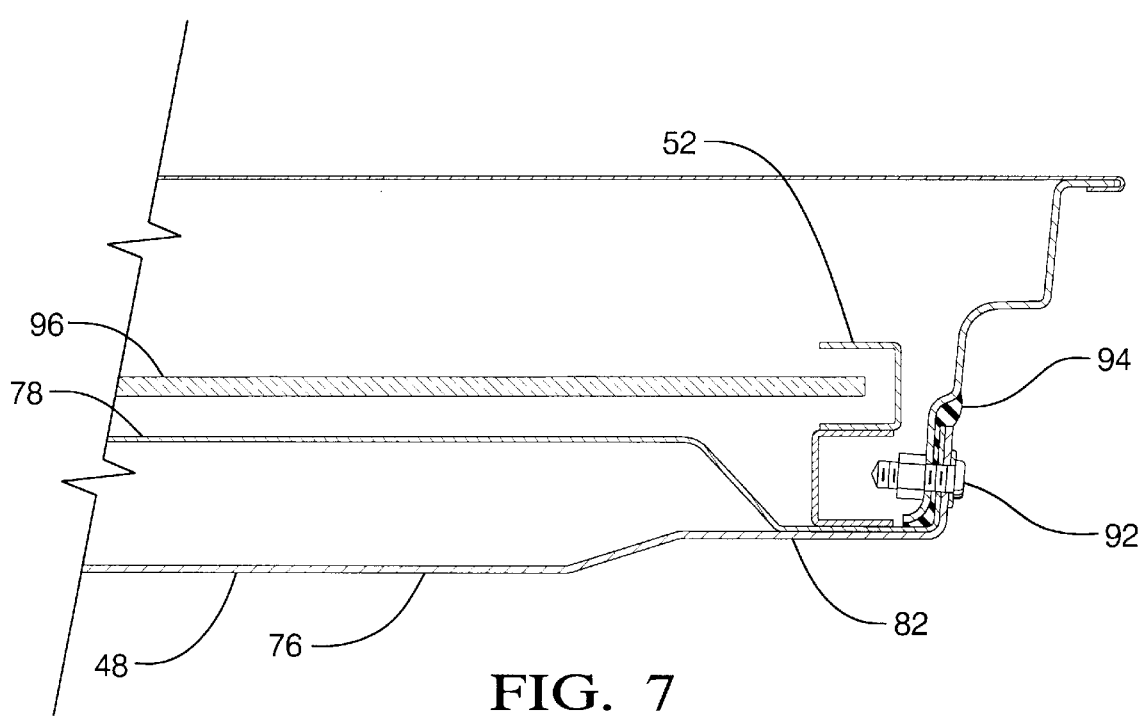
FIG. 7 is an enlarged horizontal sectional view of the rear connection of the belt reinforcement beam to the inner door panel.

The belt inner reinforcement beam 48 of the window module 16 is shown in FIGS. 1, 6 and 7. The beam 48 includes an inner plate 76 and an outer plate 78. The inner plate 76 and the outer plate 78 are joined together at both ends to form a front attachment end 80 and rear attachment end 82. The inner plate 76 and the outer plate 78 are joined together at both ends to form a front attachment end 80 and rear attachment end 82. The inner plate 76 and the outer plate 78 are also joined to each other between the ends 80 and 82 (not shown) to form a rigid tubular center portion. The upper ends of the front glass guide channel 50 and the rear glass guide channel 52 are secured to the outer plate 78. The front attachment end 80, as shown in FIG. 6, has an alignment pin 84. This alignment pin 84 is rigidly secured to the reinforcement beam 48 and is received in an aperture 86 through the inner door panel to horizontally and vertically position the window module 16. The axis of the alignment pin 84 is perpendicular to the axis of the beam assembly pins 58 and 60 and moves into the aperture 86 by pivoting the window module 16 about the axis beam assembly pins. A bolt 88 secures the front end 80 of the inner door panel 14 and holds the alignment pins 84 in the aperture 86. By positioning the bolt 88 with its axis generally perpendicular to the axis of the alignment pin 84; the alignment pin is held in place even if the bolt loosens. A seal 90 is provided by the belt inner reinforcement beam 48 and the inner door panel 16 to eliminate noise.

The rear attachment end 82 of the belt inner reinforcement beam 48 is secured to the inner door panel 14 by a bolt 92, as shown in FIG. 7. A sealed 94 is provided between the reinforcement beam 48 and the inner door panel 14. The alignment pin 84 could be on the rear attachment end 82 rather than the front attachment end 80 if desired. It would also be possible to have alignment pins on both ends on the belt reinforcement beam 48 or only on the rear attachment end 82. Slot can be provided for some fasteners and pins to accommodate variations in manufacturing tolerances if necessary.

Figure 2:
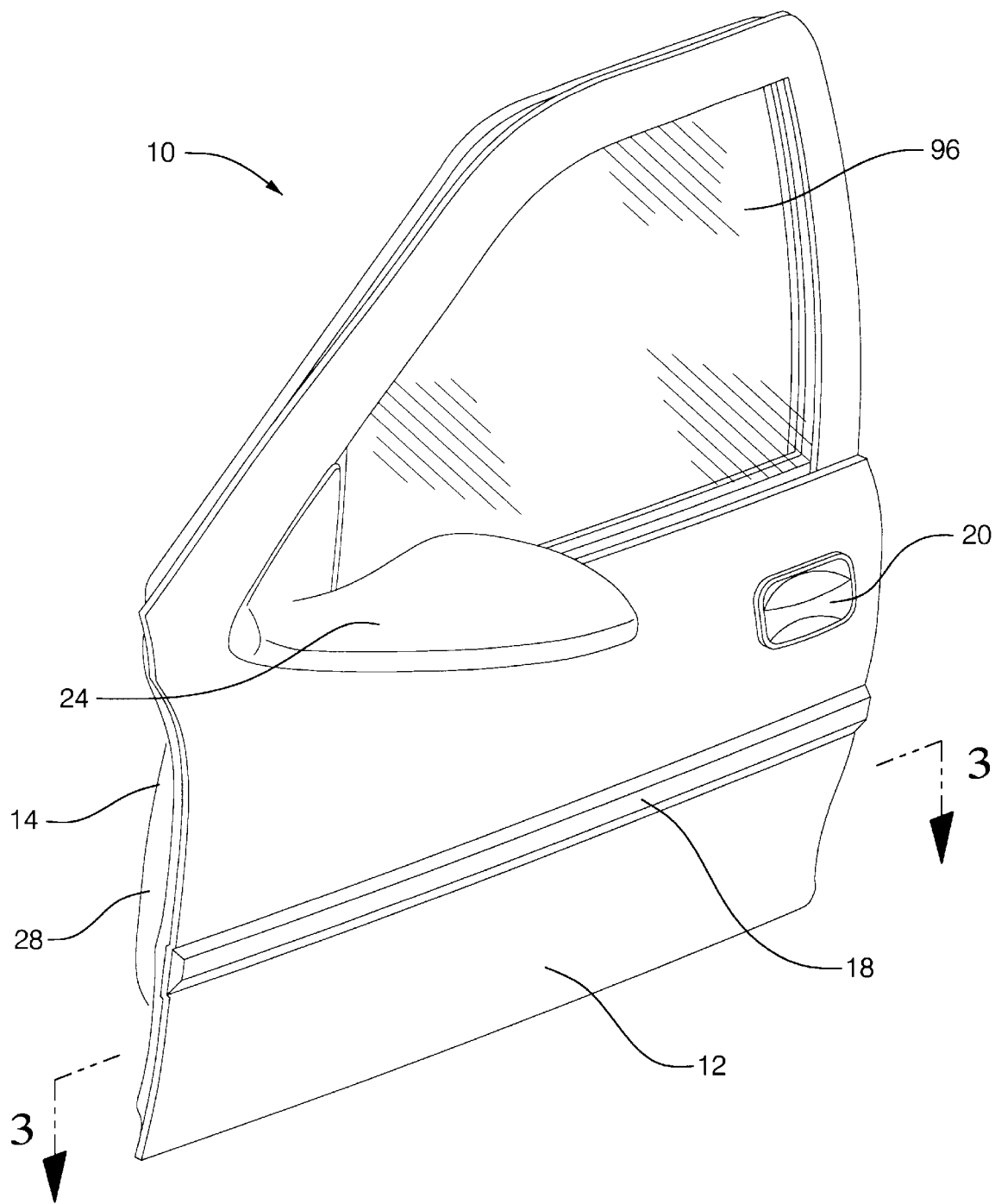
FIG. 2 is an enlarged perspective view of an assembled door.

Window glass 96 is mounted in the glass guide channels 50 and 52. A window regulator assembly 98 is attached to the window glass 96 and to the side impact beam assembly 46 or 66 and the belt reinforcement beam 48. The regulator assembly 98 as shown in FIG. 2, includes an electric motor 100 mounted support beam 102 attached to the beam assembly 46 and the reinforcement beam 48. The motor 100 drives an arcuate rack 104 to pivot links 106 and 108 that are connected to the window glass 96. However, other window regulator assemblies can be used in place of the regulator assembly 98 if desired. Amplifiers 110 for a sound system and various controllers can be carried by the support beam 102.

A door latch assembly 112 is mounted on the rear glass guide channel 52. After the window module is secured to the inner door panel 14, fasteners clamp the latch assembly to the lock face 30. Door locks and door lock controls including a wiring harness can also be part of the window module 16. The entire window module 16 can be supported by an assembly fixture and assembled at one or more workstations and tested before the module is sent to a vehicle assembly plant. Upon arrival at an assembly plant, all that remains to be done is to insert the window module 16 into the window module opening 32, move the pins 58 and 60 into slots 38 and 44, pivot the belt inner reinforcement beam 48 into engagement with the inner door panel 16 and bolt the beam in place with bolts 88 and 92.

The door inside trim panel 114 may be attached to the vehicle door 10 after the window module 16 is mounted on the inner door panel 165. However, it would also be possible to attach the inside trim panel 114 to the window module 16 and then insert the window module into the inner door panel 14.

The pin 58 and 60 or 72 and 74 are integral with the beam assemblies 46 or 66 and are received in slots 38 and 44 in the load transfer bracket 36 and 40 as described above. The pin 58 and 60 or 72 and 74 could be attached to the load transfer brackets 36 and 40 and the slots 38 and 44 could be part of the window module 16, if desired.

The disclosed embodiments are representative of the presently preferred forms of the invention, but are intended to be illustrative rather than definitive thereof. The invention is defined in the claims.

What is claimed is:

1. A door assembly comprising:
   an inner door panel with a hinge face and a lock face, a front load transfer bracket on a lower portion of the inner door panel, a rear load transfer bracket on a lower portion of the inner door panel, and a window module opening in the inner door panel;

a window module including a module frame with a side impact beam assembly, a belt reinforcement beam, a front glass guide channel secured to a front portion of the side impact beam assembly and a front portion of the belt reinforcement beam, a rear glass guide channel secured to a rear portion of the side impact beam assembly and a rear portion of the belt reinforcement beam, a window slideably mounted in the front glass guide channel and in the rear glass guide channel of said module frame and a window regulator assembly connected to the window and to said module frame;

at least one fastener securing said module frame to the inner door panel; and an outer door panel secured to the inner door panel.

2. A door assembly as set forth in claim 1 wherein the at least one fastener securing said module frame to the inner door panel includes at least one pin and slot connection pivotally connecting the side impact beam assembly to the front load transfer bracket and to the rear load transfer bracket, and at least one mechanical fastener clamping the belt reinforcement beam to the inner door panel.

3. A vehicle door comprising:

an inner door panel with a hinge face and a lock face, a front load transfer bracket on a lower portion of the inner door panel, a rear load transfer bracket on a lower portion of the inner door panel, and a window module opening in the inner door panel;

a window module including a module frame with a side impact beam assembly, a belt reinforcement beam, a front glass guide channel secured to a front portion of the side impact beam assembly and a front portion of the belt reinforcement beam, a rear glass guide channel secured to a rear portion of the side impact beam assembly and a rear portion of the belt reinforcement beam, a window slideably mounted in the front glass guide channel and in the rear glass guide channel of said module frame, and a window regulator assembly connected to the window and to said module frame;

a front pin and slot connection pivotally connecting the front portion of the side impact beam assembly to the front load transfer bracket;

and a rear pin slot connection pivotally connecting the rear portion of the side impact beam assembly to the rear load transfer bracket;

fasteners seculing the belt reinforcement beam to the inner door panel; and an outer door panel secured to the inner door panel.

4. A door assembly as set forth in claim 3 wherein the window module substantially closes the window module opening.

5. A door assembly as set forth in claim 3 including a guide pin and a guide pin aperture that receives the guide pin and positions the belt reinforcement beam relative to the inner door panel.

6. A door assembly comprising:

an inner door panel with a hinge face and a lock face;

a front load transfer bracket secured to said inner door panel adjacent to the hinge face and near a bottom portion of the inner door panel;

a rear load transfer bracket secured to said inner door panel adjacent to lock face and near the bottom portion of the inner door panel;

a window module including a side impact beam assembly, a belt reinforcement beam, a front glass guide channel secured to a front portion of the side impact beam assembly and a front portion of the belt reinforcement beam, a rear glass guide channel secured to a rear portion of the side impact beam assembly and a rear portion of the side impact beam, a window slideably mounted in the front glass guide channel and in the rear glass guide channel and a window regulator assembly for raising and lowering the window connected to the window, the side impact beam assembly and the belt reinforcement beam;

a rear pin and slot connection pivotally connecting the rear portion of the side impact beam assembly to the rear load transfer bracket for pivotal movement about a first generally horizontal fore and aft axis;

a front pin and slot connection pivotally connecting the front portion of side impact beam assembly to the front load transfer bracket for pivotal about a second generally horizontal fore and aft axis;

a pair of mechanical fasteners securing the belt reinforcement beam to the inner door panel; and an outer door skin secured to the inner door panel.

7. A vehicle door set forth in claim 6 wherein the rear pin and slot connection has an enlarged rear pin free end that transfers tension loads from the side impact beam assembly to the lock face and the front pin and slot connection has an enlarged front pin free end that transfers tension loads from the side impact beam assembly to the hinge face.

8. A door assembly as set forth in claim 6 wherein the rear pin and slot connection includes a rear pin secured to the rear portion of the side impact beam assembly and a slot in the rear load transfer bracket having an upper opening and a lower base that receives the rear pin;

and wherein the front pin and slot connection includes a front pin secured to the front portion of the side impact beam assembly and a slot in the front load transfer bracket having an upper opening and a lower base, that receives the front pin.

9. A door assembly as set forth in claim 6 including a front alignment pin secured to a front portion of the belt reinforcement beam and received in a front alignment aperture in the inner door panel, a rear alignment pin secured to a rear portion of the belt reinforcement beam and received in a rear alignment aperture in the inner door panel and wherein the pair of fasteners securing the belt reinforcement beam to the inner door panel maintain engagement between the front alignment pin and the front alignment aperture and between the rear alignment pin and the rear alignment aperture.

10. A door assembly as set forth in claim 6 including a door latch and lock assembly attached to the rear glass guide channel of the door and window module.

* * * * *